United States Patent
Minami et al.

(10) Patent No.: US 10,260,461 B2
(45) Date of Patent: Apr. 16, 2019

(54) LOW TEMPERATURE COOLING DEVICE FOR INTERNAL COMBUSTION ENGINE

(71) Applicant: DENSO CORPORATION, Kariya, Aichi-pref. (JP)

(72) Inventors: Keitarou Minami, Kariya (JP); Masashi Miyagawa, Kariya (JP); Hideaki Ichihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 23 days.

(21) Appl. No.: 15/572,139

(22) PCT Filed: Apr. 14, 2016

(86) PCT No.: PCT/JP2016/002028
§ 371 (c)(1),
(2) Date: Nov. 6, 2017

(87) PCT Pub. No.: WO2016/178303
PCT Pub. Date: Nov. 10, 2016

(65) Prior Publication Data
US 2018/0119651 A1 May 3, 2018

(30) Foreign Application Priority Data
May 7, 2015 (JP) .................................. 2015-094786

(51) Int. Cl.
*F02B 47/08* (2006.01)
*F02M 26/33* (2016.01)
(Continued)

(52) U.S. Cl.
CPC ............... *F02M 26/33* (2016.02); *F01P 7/16* (2013.01); *F02B 29/0437* (2013.01);
(Continued)

(58) Field of Classification Search
CPC .. F02M 26/06; F02M 26/35; F02M 2026/004; F02D 41/0072; F02D 2041/1412; F02D 2200/0418
(Continued)

(56) References Cited

U.S. PATENT DOCUMENTS

2009/0277428 A1* 11/2009 Marsh ................. F02B 29/0425
123/568.12
2011/0011377 A1* 1/2011 Ikeda ..................... F02M 26/05
123/568.12

(Continued)

FOREIGN PATENT DOCUMENTS

JP 2009-174444 8/2009
JP 2014-148957 8/2014

*Primary Examiner* — Marguerite J McMahon
*Assistant Examiner* — James J Kim
(74) *Attorney, Agent, or Firm* — Nixon & Vanderhye PC

(57) ABSTRACT

A low temperature cooling device applied to an internal combustion engine includes an EGR device, a low temperature coolant circuit, a prediction unit predicting whether an EGR cooler falls into a state where a cooling performance falls short according to at least one of an operating state of an internal combustion engine and an outside air environment while a control that dehumidifies an EGR gas by cooling the EGR gas in the EGR cooler is performed, and a control unit performing at least one of a first increase control that increases a flow rate of a coolant flowing into the EGR cooler, a second increase control that increases an air rate of a radiator fan cooling a radiator, and an inhibition control that inhibits the EGR gas from flowing back when the prediction unit predicts that the EGR cooler falls into the state where the cooling performance falls short.

8 Claims, 7 Drawing Sheets

(51) Int. Cl.
  *F01P 7/16*    (2006.01)
  *F02M 26/06*   (2016.01)
  *F02M 26/28*   (2016.01)
  *F02M 26/24*   (2016.01)
  *F02M 26/35*   (2016.01)
  *F02B 29/04*   (2006.01)

(52) U.S. Cl.
  CPC ............ *F02M 26/06* (2016.02); *F02M 26/24* (2016.02); *F02M 26/28* (2016.02); *F02M 26/35* (2016.02); *Y02T 10/146* (2013.01)

(58) Field of Classification Search
  USPC ............ 123/41.05, 540, 568.11, 568.12, 542
  See application file for complete search history.

(56)            References Cited

U.S. PATENT DOCUMENTS

2011/0239996 A1* 10/2011 Wikstrom .............. F02M 26/24
                                                  123/568.12
2012/0279200 A1* 11/2012 Nam .................. F02M 25/0227
                                                       60/273
2015/0275698 A1* 10/2015 Kawai ....................... F02G 5/02
                                                       60/604

* cited by examiner

LOW TEMPERATURE COOLING DEVICE FOR INTERNAL COMBUSTION ENGINE

CROSS REFERENCE TO RELATED APPLICATION

This application is the U.S. national phase of International Application No. PCT/JP2016/002028 filed on Apr. 14, 2016 which designated the U.S. and claims priority to Japanese Patent Application No. 2015-94786 filed on May 7, 2015, the entire contents of each of which are incorporated herein by reference.

TECHNICAL FIELD

The present disclosure relates to a low temperature cooling device applied to an internal combustion engine which includes a low temperature coolant circuit circulating a coolant through an intercooler, an EGR cooler, and a radiator.

BACKGROUND ART

An internal combustion engine installed to a vehicle is equipped with an EGR device which returns a part of an exhaust gas to an intake passage as an EGR gas with an aim of enhancing fuel efficiency and reducing knocking and an emission of an exhaust gas. However, when an EGR gas with a high water content is returned to the intake passage, condensate water may be produced when an intake gas, which is a mixture of the EGR gas and intake air (fresh air), is cooled in an intercooler. The condensate water possibly gives rise to a corrosion of a metal part.

A technique of restricting production of condensate water in the intercooler is described in, for example, Patent Literature 1. According to the disclosed technique, a coolant circuit circulating a coolant through an intercooler and an EGR cooler is provided, and condensate water is forcedly produced by cooling an EGR gas in the EGR cooler. The condensate water is collected into a trap portion to dehumidify the EGR gas. The EGR gas is then heated in an EGR heater to lower a relative humidity and returned to an intake passage.

PRIOR ART LITERATURES

Patent Literature

Patent Literature 1: JP2009-174444A

SUMMARY OF INVENTION

Inventors of the present disclosure discovered a new problem as follows while conducting a study on a system including a low temperature coolant circuit circulating a coolant through an intercooler, an EGR cooler, and a radiator.

That is, when an internal combustion engine is decelerating, a received heat amount of the coolant in the EGR cooler decreases as a flow rate of an EGR gas decreases, and a released heat amount of the coolant in the radiator decreases as a vehicle speed decreases. However, the coolant which has passed through the EGR cooler arrives the radiator after a delay comparable to a volume from the EGR cooler to the radiator. Hence, the coolant which passes through the radiator after a released heat amount in the radiator has decreased is the relatively warm coolant which had passed through the EGR cooler before a received heat amount in the EGR cooler has decreased. Accordingly, a temperature of the coolant which has passed through the radiator rises temporarily after a deceleration is started, and then a temperature of the coolant flowing into the EGR cooler rises temporarily, too. The EGR cooler thus may possibly fall into a state where cooling performance temporarily falls short. Hence, an EGR gas may not be cooled sufficiently in the EGR cooler during a transient operation to accelerate the once-decelerated internal combustion engine, in which case the EGR gas may not be dehumidified sufficiently and condensate water may possibly be produced when an intake gas is cooled in the intercooler.

The present disclosure has an object to provide a low temperature cooling device applied to an internal combustion engine which restricts production of condensate water during a transient operation.

According to an aspect of the present disclosure, the low temperature cooling device applied to the internal combustion engine includes an EGR device returning a part of an exhaust gas of an internal combustion engine to an intake passage as an EGR gas, a low temperature coolant circuit circulating a coolant through an intercooler cooling an intake gas of the internal combustion engine, an EGR cooler cooling the EGR gas, and a radiator, a prediction unit predicting whether the EGR cooler falls into a state where a cooling performance falls short according to at least one of an operating state of the internal combustion engine and an outside air environment while a control that dehumidifies the EGR gas by cooling the EGR gas in the EGR cooler is performed, and a control unit performing at least one of a first increase control that increases a flow rate of the coolant flowing into the EGR cooler, a second increase control that increases an air rate of a radiator fan cooling the radiator, and an inhibition control that inhibits the EGR gas from flowing back when the prediction unit predicts that the EGR cooler falls into the state where the cooling performance falls short.

In the above description, a delay of the coolant caused after passing through the EGR cooler and before arriving the radiator can be shorter by performing the first increase control to increase the flow rate of the coolant flowing into the EGR cooler is performed when the EGR cooler is predicted to fall into the state where the cooling performance falls short while a control that dehumidifies the EGR gas by cooling the EGR gas in the EGR cooler in a decelerating operation of the internal combustion engine. Owing to the configuration as above, a rise in inflow coolant temperature of the EGR cooler can be restricted by restricting a rise in outflow coolant temperature of the radiator after a deceleration is started. Hence, an inconvenience that the EGR cooler falls into the state where the cooling performance falls short can be avoided. Thus, the EGR gas can be sufficiently dehumidified by cooling the EGR gas sufficiently in the EGR cooler during the transient operation where the engine is accelerated after being decelerated. Consequently, production of condensate water in the intercooler can be restricted.

Further, a decrease in released heat amount in the radiator can be restricted by performing the second increase control to increase the air rate of the radiator fan when the EGR cooler is predicted to fall into the state where the cooling performance falls short while a control that dehumidifies the EGR gas by cooling the EGR gas in the EGR cooler is performed. Owing to the configuration as above, a rise in inflow coolant temperature of the EGR cooler can be restricted by restricting a rise in outflow coolant temperature of the radiator after a deceleration is started. Hence, an inconvenience that the EGR cooler falls into the state where the cooling performance falls short can be avoided. Thus, the EGR gas can be sufficiently dehumidified by cooling the EGR gas sufficiently in the EGR cooler during the transient operation where the engine is accelerated after being decelerated. Consequently, production of condensate water in the intercooler can be restricted.

Furthermore, the inhibition control that inhibits the EGR gas from flowing back is performed when the EGR cooler is predicted to fall into the state where the cooling performance falls short in the decelerating operation of the internal combustion engine. Consequently, even when the EGR cooler falls into the state where the cooling performance falls short during the transient operation where the engine is accelerated after being decelerated, production of condensate water in an intercooler can be restricted.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, concrete embodiments for carrying out the present disclosure will be described.

First Embodiment

A first embodiment of the present disclosure will be described according to FIG. 1 through FIG. 6.

Figure 1:
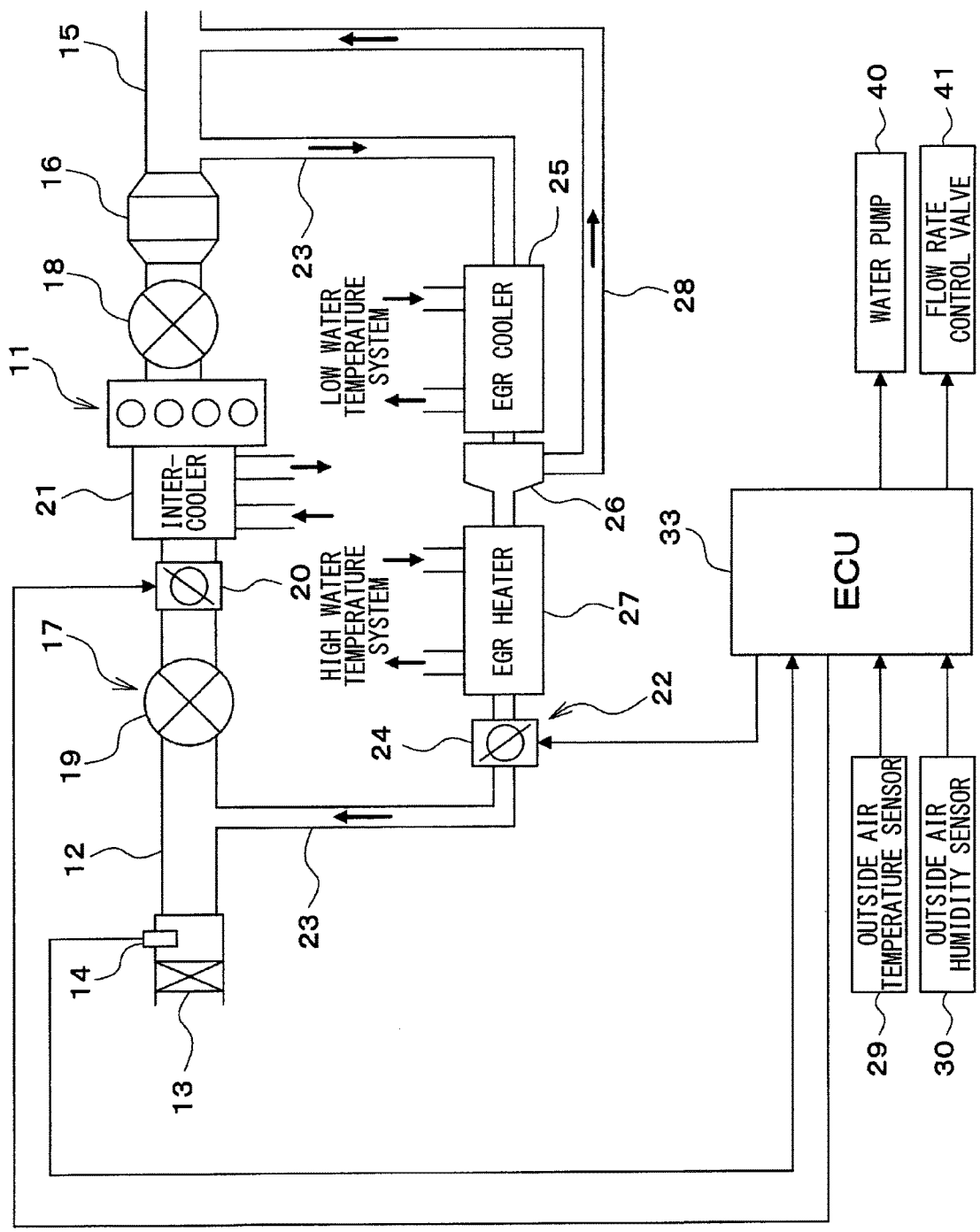
FIG. 1 is a view showing a schematic configuration of an engine control system according to a first embodiment of the present disclosure.

A schematic configuration of an engine control system will be described first according to FIG. 1.

An air cleaner 13 is provided uppermost-stream of an intake pipe 12 (intake passage) of an internal combustion engine 11 (hereinafter, referred to simply as an engine 11). An air flow meter 14 detecting an amount of intake air is provided downstream of the air cleaner 13. Meanwhile, a catalyst 16, such as a three-way catalyst purifying CO, HC, and NOx in an exhaust gas, is provided to an exhaust pipe 15 of the engine 11.

The engine 11 is equipped with a supercharger 17 supercharging an intake gas into the engine 11. The supercharger 17 is an exhaust turbine driving type. The intake gas can be intake air (fresh air) alone or a mixed gas of intake air and an EGR gas. The supercharger 17 includes an exhaust turbine 18 provided upstream of the catalyst 16 in the exhaust pipe 15, and a compressor 19 provided downstream of the air flow meter 14 in the intake pipe 12. The exhaust turbine 18 and the compressor 19 are coupled to rotate as one unit. Hence, the supercharger 17 supercharges the intake gas into the engine 11 using the compressor 19 which is rotationally driven by rotationally driving the exhaust turbine 18 with kinetic energy of an exhaust gas.

A throttle valve 20 is provided downstream of the compressor 19 in the intake pipe 12 and an opening degree of the throttle valve 20 is regulated by a motor (not shown). An intercooler 21 cooling the intake gas and a surge tank (not shown) are integrally provided downstream of the throttle valve 20. The intercooler 21 is a water cooling type. The intercooler 21 uses a coolant and cools the intake gas which has been supercharged by the supercharger 17 and therefore become hot. Consequently, in-cylinder charging efficiency of the intake gas can be increased, which can in turn enhance an output of the engine 11.

A fuel injection valve (not shown) performing in-cylinder injection or intake port injection is attached to each cylinder of the engine 11. Sparking plugs (not shown) for respective cylinders are attached to a cylinder head of the engine 11 to ignite an air-fuel mixture in the respective cylinders with a spark discharge by the corresponding sparking plugs.

An EGR device 22 that is an LPL (Low Pressure Loop) type and returns a part of an exhaust gas from the exhaust pipe 15 to the intake pipe 12 as an EGR gas is equipped to the engine 11. The EGR device 22 includes an EGR pipe 23 connected between a downstream side of the exhaust turbine 18 in the exhaust pipe 15 (for example, downstream of the catalyst 16) and an upstream side of the compressor 19 in the intake pipe 12. An EGR valve 24 regulating a flow rate of the EGR gas is provided to the EGR pipe 23. A flow rate of the EGR gas referred to herein means a flow rate of the EGR gas which has passed through the EGR pipe 23 (EGR device 22). An EGR cooler 25 cooling the EGR gas, a separator 26 separating and collecting condensate water in the EGR gas which has passed through the EGR cooler 25, and an EGR heater 27 heating the EGR gas which has passed through the separator 26 are also provided to the EGR pipe 23. The EGR cooler 25 is a water cooling type.

The EGR cooler 25 forcedly produces condensate water by cooling the EGR gas with the coolant in a low water temperature system as the coolant of the intercooler 21. The separator 26 separates and collects the condensate water in the EGR gas. The condensate water collected at the separator 26 is discharged to the exhaust pipe 15 through a pipe 28. The EGR heater 27 heats the EGR gas with the coolant in a high water temperature system as a coolant of the engine 11 to lower a relative humidity of the EGR gas.

An outside air temperature sensor 29 detecting an outside air temperature (To) and an outside air humidity sensor 30 detecting an outside air humidity are provided to a place less susceptible to heat of the engine 11, such as upstream of the intake pipe 12 or an outside of the intake pipe 12. An intake gas temperature sensor 31 detecting a temperature of the intake gas which has passed through the intercooler 21 is provided downstream of the intercooler 21 (for example, the surge tank or an intake manifold). An EGR gas temperature sensor 32 detecting a temperature of the EGR gas which has passed through the EGR cooler 25 is provided downstream of the EGR cooler 25 (for example, between the EGR cooler 25 and the separator 26 or between the separator 26 and the EGR heater 27).

Outputs of the foregoing sensors are inputted into an electronic control unit (ECU) 33. The ECU 33 is chiefly formed of a micro-computer and controls an amount of fuel injection, ignition timing, a throttle opening degree (amount of intake air), and so on according to an engine operating state by running various engine control programs pre-stored in an internal ROM (storage medium).

The ECU 33 calculates a target EGR ratio according to an engine operating state (for example, an engine speed and an engine load), and controls an opening degree of the EGR valve 24 to reach the target EGR ratio.

Figure 2:
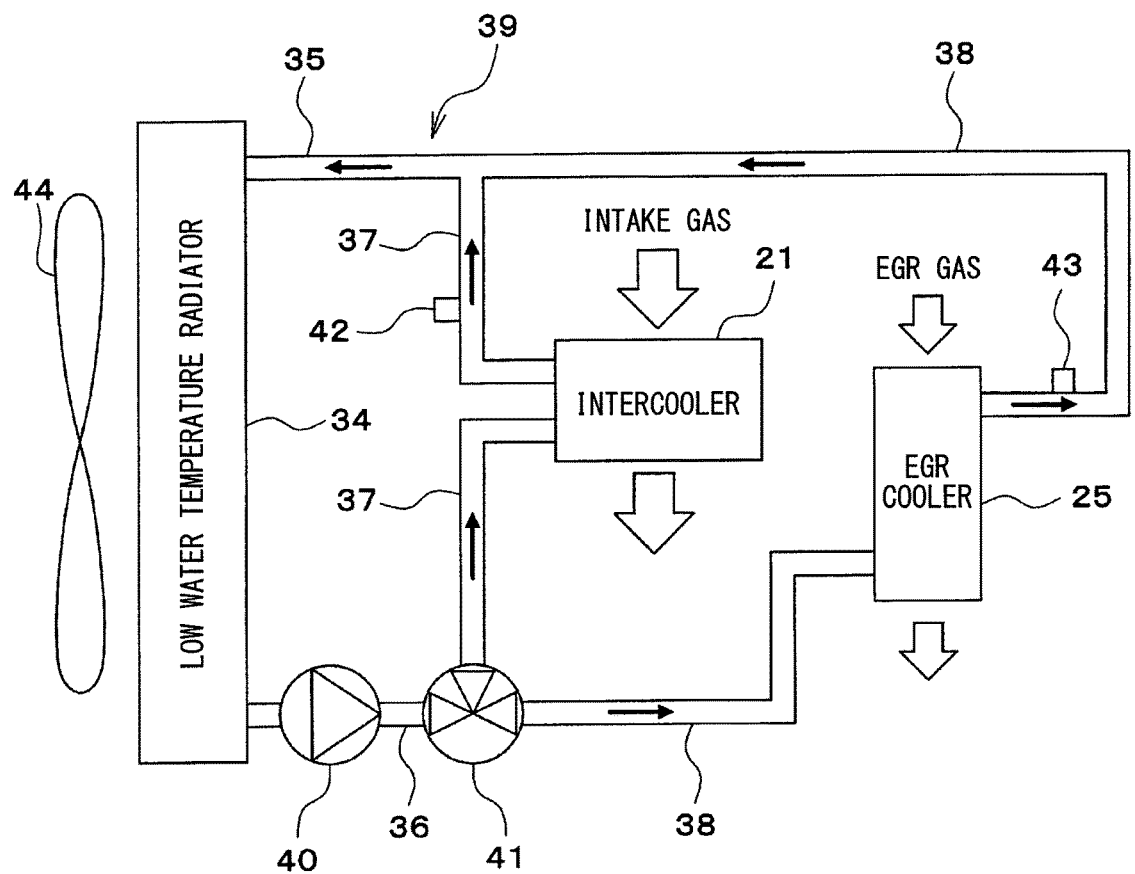
FIG. 2 is a view showing a schematic configuration of a low temperature cooling system.

A schematic configuration of a low temperature cooling system will now be described according to FIG. 2.

An intercooler channel 37 to circulate the coolant through the intercooler 21 and an EGR cooler channel 38 to circulate the coolant through the EGR cooler 25 are connected in parallel between an inlet channel 35 connected to an inlet port of a radiator (low water temperature radiator) 34 and an outlet channel 36 connected to an outlet port of the low water temperature radiator 34. A low temperature coolant circuit 39 cooling the coolant in the low water temperature radiator 34 circulate through the intercooler 21 and the EGR cooler 25 is thus formed. In the present embodiment, a low temperature cooling device for the engine 11 has the EGR device 22, the low temperature coolant circuit 39, and the ECU 33.

The low temperature coolant circuit 39 includes a water pump 40 provided to the outlet channel 36, and a flow rate control valve 41 located at a branch point of the intercooler channel 37 and the EGR cooler channel 38. The water pump 40 is an electric driving type. The flow rate control valve 41 is driven on a motor or the like and regulates a flow rate ratio between the coolant flowing to the intercooler 21 and the coolant flowing into the EGR cooler 25 according to an operating position of a valve body. The flow rate control valve 41 has a self-return function by which the valve body is pushed in a direction to an initial position (a position at which a flow rate proportion of the coolant flowing into the intercooler 21 reaches a maximum) to return the valve body to the initial position when energization is stopped for the flow rate proportion of the coolant flowing into the intercooler 21 to reach a maximum (for example, 100%).

The intercooler channel 37 is provided with a first coolant temperature sensor 42 detecting an outflow coolant temperature Toic of the intercooler 21 (a temperature of the coolant which has passed through the intercooler 21). The EGR cooler channel 38 is provided with a second coolant temperature sensor 43 detecting an outflow coolant temperature Toec of the EGR cooler 25 (a temperature of the coolant which has passed through the EGR cooler 25). An electric radiator fan 44 is provided near the low water temperature radiator 34 to cool the radiator 34.

In a case where the EGR gas with a high water content is returned to the intake pipe 12, condensate water may be produced when the intake gas, which as a mixture of the EGR gas and intake air (fresh air), is cooled in the intercooler 21. The condensate water possibly gives rise to a corrosion of a metal part.

In order to eliminate such an inconvenience, the EGR gas is dehumidified by forcedly producing condensate water by cooling the EGR gas in the EGR cooler 25 and separating and collecting the condensate water in the EGR gas by the separator 26. The EGR gas is then heated in the EGR heater 27 to lower a relative humidity and returned to the intake pipe 12.

Figure 3:
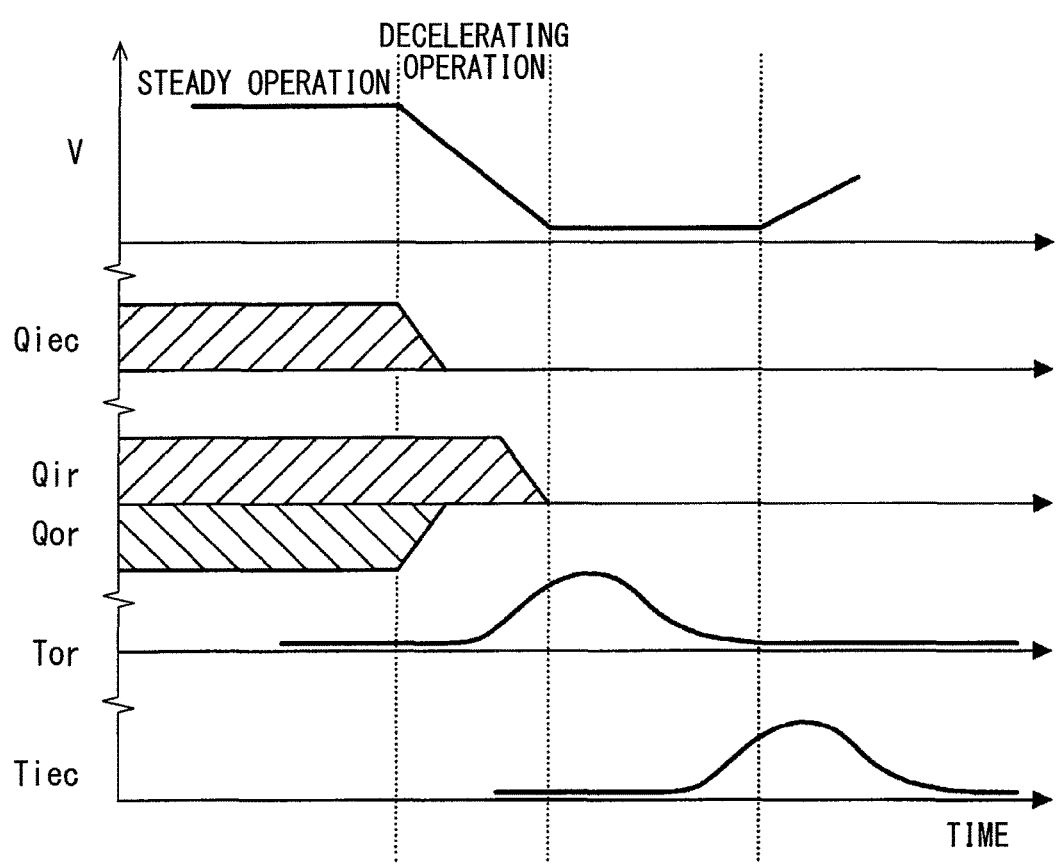
FIG. 3 shows a time chart used to describe deterioration of cooling performance of an EGR cooler.

As is shown in FIG. 3, when the engine 11 is decelerating, a received heat amount (Qiec) of the coolant in the EGR cooler 25 decreases as a flow rate of the EGR gas decreases, and a released heat amount (Qor) of the coolant in the radiator 34 decreases as a vehicle speed (V) decreases.

However, the coolant which has passed through the EGR cooler 25 arrives the radiator 34 after a delay comparable to a volume from the EGR cooler 25 to the radiator 34. Hence, the coolant which passes through the radiator 34 after a released heat amount in the radiator 34 has decreased is the relatively warm coolant which had passed through the EGR cooler 25 before a received heat amount in the EGR cooler 25 has decreased. Accordingly, unless any preventive measure is taken, an outflow coolant temperature (Tor) of the radiator 34 (a temperature of the coolant which has passed through the radiator 34) rises temporarily after a deceleration is started, and then an inflow coolant temperature (Tiec) of the EGR cooler 25 (a temperature of the coolant flowing into the EGR cooler 25) rises temporarily, too. The EGR cooler 25 may thus possibly fall into a state where cooling performance temporarily falls short. Hence, the EGR gas may not be cooled sufficiently in the EGR cooler 25 during a transient operation where the engine 11 is accelerated after being decelerated, in which case the EGR gas may not be dehumidified sufficiently and condensate water may possibly be produced when the intake gas is cooled in the intercooler 21. In FIG. 3, Qir represents a received heat amount of the coolant in the radiator 34.

To eliminate such an inconvenience, a control as follows is performed in the first embodiment by performing a condensate water restriction control routine of FIG. 5 by using the ECU 33. While a control that dehumidifies the EGR gas by cooling the EGR gas in the EGR cooler 25 is performed, whether the EGR cooler 25 falls into a state where cooling performance falls short is predicted according to at least one of an engine operating state and an outside air environment. When the EGR cooler 25 is predicted to fall into a state where cooling performance falls short, a first increase control that increases a flow rate of the coolant flowing into the EGR cooler 25 and a second increase control that increases an air rate of a radiator fan 44 are performed.

Figure 4:
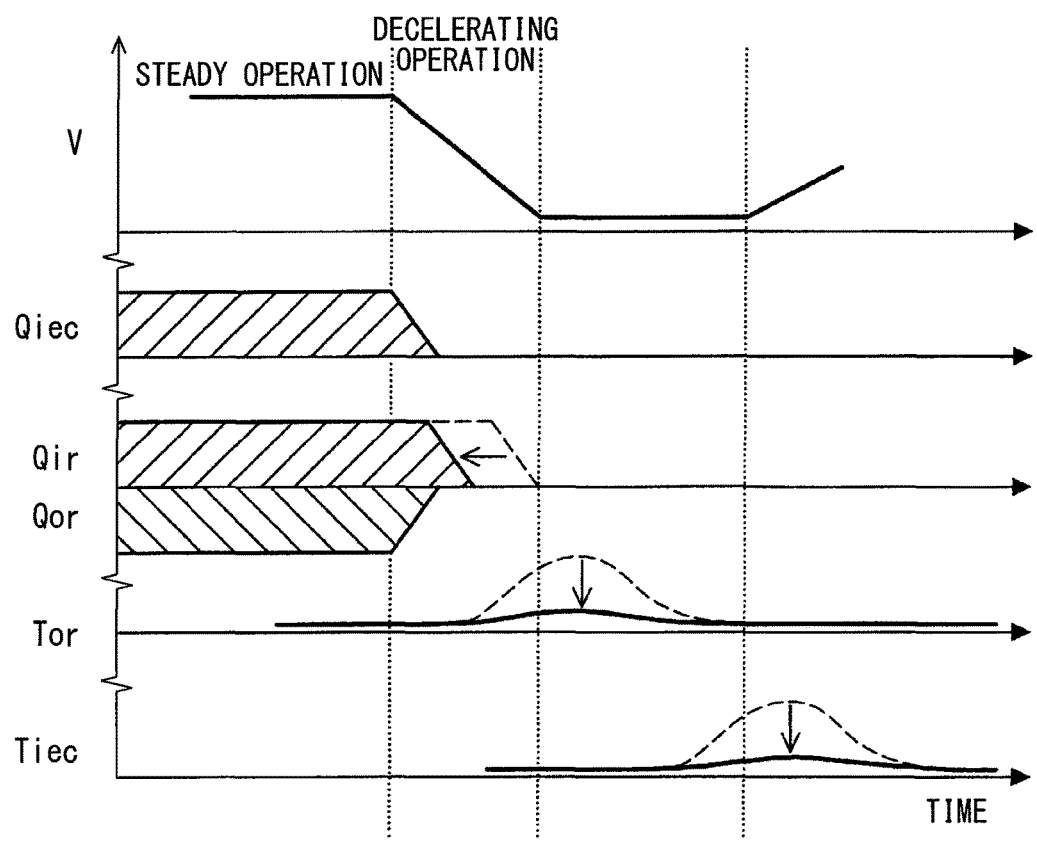
FIG. 4 is a time chart used to describe an effect of the first embodiment.

By performing the first increase control to increase a flow rate of the coolant flowing into the EGR cooler 25 according to a prediction that the EGR cooler 25 falls into a state where cooling performance falls short when the engine 11 is decelerating, a delay of the coolant caused after passing through the EGR cooler 25 and before arriving the radiator 34 can be shorter. Owing to the configuration as above, as is shown in FIG. 4, an amount of the relatively warm coolant which has passed through the EGR cooler 25 before a received heat amount in the EGR cooler 25 decreases and passes through the radiator 34 after a released heat amount in the radiator 34 decreases can be reduced. Hence, a rise in inflow coolant temperature of the EGR cooler 25 can be restricted by restricting a rise in outflow coolant temperature of the radiator 34 after a deceleration is started. Consequently, an inconvenience that the EGR cooler 25 falls into a state where cooling performance falls short can be avoided.

By performing the second increase control to increase the air rate of the radiator fan 44 according to a prediction that the EGR cooler 25 falls into a state where cooling performance falls short when the engine 11 is decelerating, a decrease in released heat amount in the radiator 34 can be restricted. Owing to the configuration as above, too, a rise in inflow coolant temperature of the EGR cooler 25 can be restricted by restricting a rise in outflow coolant temperature of the radiator 34 after a deceleration is started. Consequently, an inconvenience that the EGR cooler 25 falls into a state where cooling performance falls short can be avoided.

Figure 5:
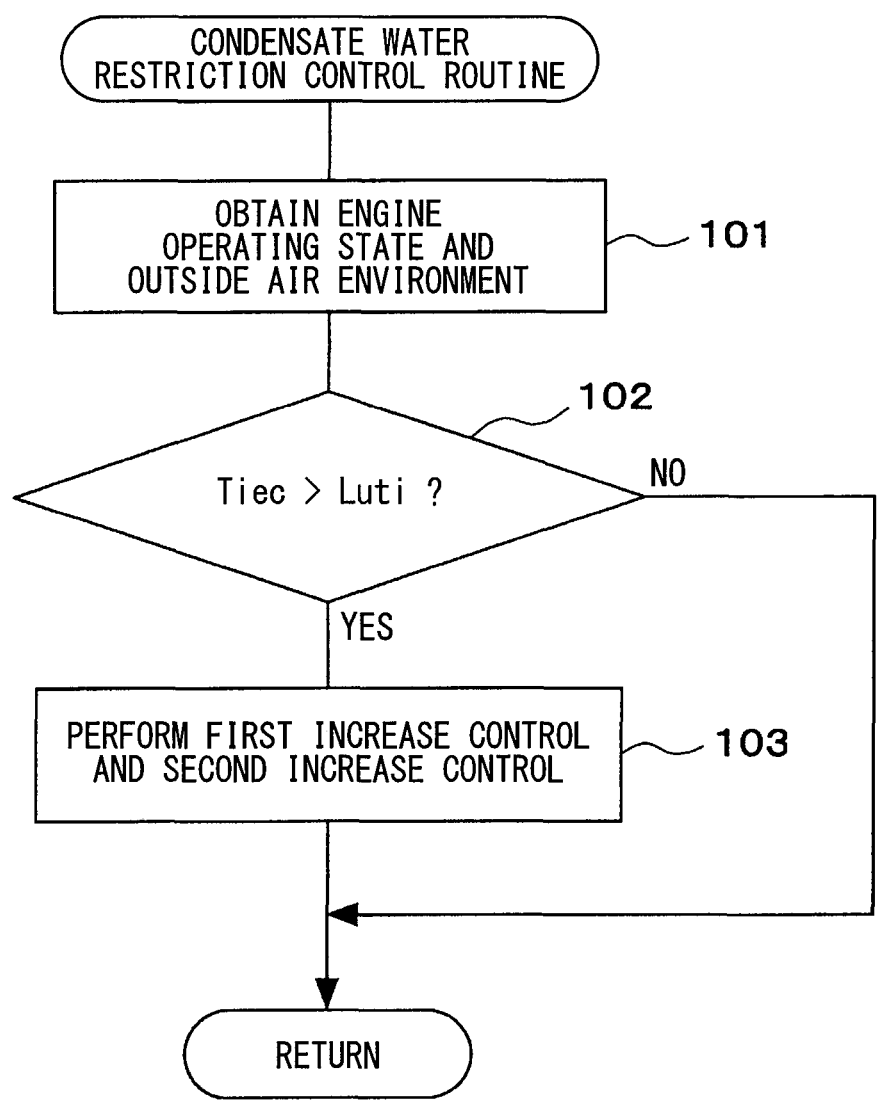
FIG. 5 shows a flowchart depicting a processing flow of a condensate water restriction control routine of the first embodiment.

The following will describe a processing content of the condensate water restriction control routine of FIG. 5 performed by the ECU 33 in the first embodiment.

The condensate water restriction control routine depicted in FIG. 5 is performed repetitively in predetermined cycles while a control that dehumidifies the EGR gas by cooling the EGR gas in the EGR cooler 25 is performed. When the routine is started, an engine operating state (for example, an engine load, an engine speed, a flow rate of the EGR gas, and an outflow coolant temperature of the EGR cooler 25) and an outside air environment (for example, an outside air temperature and an outside air humidity) are obtained first in 101.

Subsequently, advancement is made to 102, in which whether the EGR cooler 25 falls into a state where cooling performance falls short is predicted by predicting whether the inflow coolant temperature of the EGR cooler 25 exceeds an allowable upper limit value (Luti). Processing in 102 functions as a prediction unit.

Herein, the inflow coolant temperature of the EGR cooler 25 is predicted according to, for example, one or two or more of an engine load, an engine speed, a flow rate of the EGR gas, and an outflow coolant temperature of the EGR cooler 25. The allowable upper limit value (for example, an upper limit value of the inflow coolant temperature of the EGR cooler 25 necessary to ensure required cooling performance of the EGR cooler 25) is set according to an outside air temperature and an outside air humidity. Whether the inflow coolant temperature of the EGR cooler 25 exceeds the allowable upper limit value is predicted according to whether a prediction value of the inflow coolant temperature of the EGR cooler 25 is greater than the allowable upper limit value.

When it is predicted in 102 that the inflow coolant temperature of the EGR cooler 25 does not exceed the allowable upper limit value, the EGR cooler 25 is predicted not to fall into a state where cooling performance falls short. Hence, the routine is ended without performing processing in 103.

Meanwhile, when it is predicted in 102 that the inflow coolant temperature of the EGR cooler 25 exceeds the allowable upper limit value, the EGR cooler 25 is predicted to fall into a state where cooling performance falls short. Hence, advancement is made to 103, in which the first increase control that increases a flow rate of the coolant flowing into the EGR cooler 25 and the second increase control that increases the air rate of the radiator fan 44 are performed. The processing in 103 functions as a control unit.

In the first increase control that increases a flow rate of the coolant flowing into the EGR cooler 25, a flow rate of the coolant flowing into the EGR cooler 25 is increased by controlling the flow rate control valve 41 to increase a flow rate proportion of the coolant flowing into the EGR cooler 25 or by controlling the water pump 40 to increase a discharge amount of the water pump 40. A flow rate of the coolant flowing into the EGR cooler 25 may be controlled according to an engine operating state and an outside air environment.

In the second increase control that increases the air rate of the radiator fan 44, the air rate of the radiator fan 44 is increased by switching the radiator fan 44 at rest to a rotation state or controlling the radiator fan 44 to rotate at a higher speed. The air rate of the radiator fan 44 may be controlled according to an engine operating state and an outside air environment.

In the first embodiment described above, the first increase control that increases a flow rate of the coolant flowing into the EGR cooler 25 and the second increase control that increases the air rate of the radiator fan 44 are performed when the EGR cooler 25 is predicted to fall into a state where cooling performance falls short while a control that dehumidifies the EGR gas by cooling the EGR gas in the EGR cooler 25 is performed. Owing to the configuration as above, a rise in inflow coolant temperature of the EGR cooler 25 can be restricted by restricting a rise in outflow coolant temperature of the radiator 34 after a deceleration is started. Hence, an inconvenience that the EGR cooler 25 falls into a state where cooling performance falls short can be avoided. Thus, the EGR gas can be sufficiently dehumidified by cooling the EGR gas sufficiently in the EGR cooler 25 during the transient operation where the engine 11 is accelerated after being decelerated. Consequently, production of condensate water in the intercooler 21 can be restricted.

In the first embodiment, the EGR cooler 25 is predicted to fall into a state where cooling performance falls short when it is predicted that the inflow coolant temperature of the EGR cooler 25 exceeds the allowable upper limit value. Hence, whether the EGR cooler 25 falls into a state where cooling performance falls short can be predicted with accuracy.

In the first embodiment, the inflow coolant temperature of the EGR cooler 25 is predicted according to operating state parameters, such as an engine load, an engine speed, a flow rate of the EGR gas, and an outflow coolant temperature of the EGR cooler 25. Because the inflow coolant temperature of the EGR cooler 25 varies with the foregoing operating state parameters, the inflow coolant temperature of the EGR cooler 25 can be predicted with accuracy by using the foregoing operating state parameters. Also, the allowable upper limit value is set according to an outside air temperature and an outside air humidity. The allowable upper limit value of the inflow coolant temperature of the EGR cooler 25 varies with required cooling performance of the EGR cooler 25, which varies with an outside air temperature and an outside air humidity. Hence, by using an outside air temperature and an outside air humidity, the allowable upper limit value can be set appropriately.

In the first embodiment, the separator 26 separating and collecting condensate water in the EGR gas which has passed through the EGR cooler 25, and the EGR heater 27 heating the EGR gas which has passed through the separator 26 are provided. Hence, an effect of restricting production of condensate water in the intercooler 21 can be enhanced.

In the first embodiment, both of the first increase control that increases a flow rate of the coolant flowing into the EGR cooler 25 and the second increase control that increases the air rate of the radiator fan 44 are performed when it is predicted that the inflow coolant temperature of the EGR cooler 25 exceeds the allowable upper limit value (that is, when the EGR cooler 25 is predicted to fall into a state where cooling performance falls short). However, the present disclosure is not limited to the configuration as above and only either one of the first increase control that increases a flow rate of the coolant flowing into the EGR cooler 25 and the second increase control that increases the air rate of the radiator fan 44 may be performed.

Second Embodiment

A second embodiment of the present disclosure will now be described using FIG. 6. A description will be omitted or given simply for portions substantially same as counterparts of the first embodiment above and the following will chiefly describe a portion different from the first embodiment above.

Figure 6:
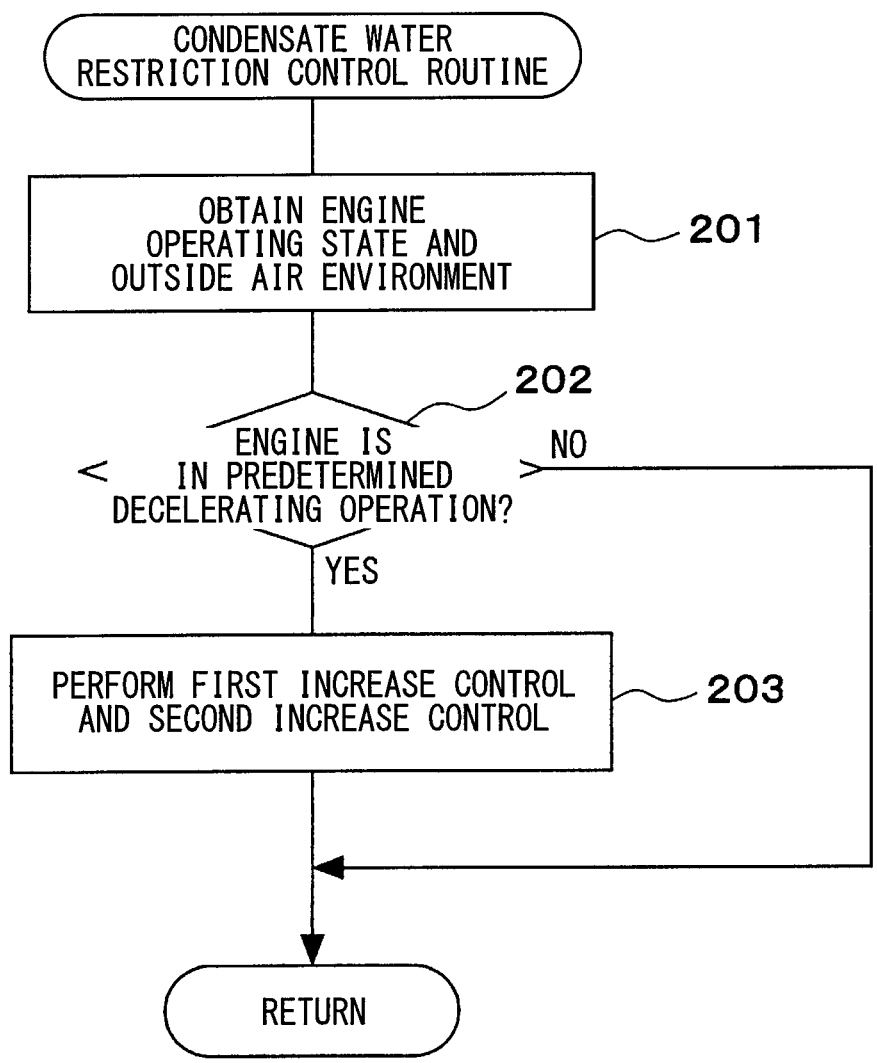
FIG. 6 shows a flowchart depicting a processing flow of a condensate water restriction control routine of a second embodiment.

In the second embodiment, an EGR cooler 25 is predicted to fall into a state where cooling performance falls short when an engine 11 reaches a predetermined decelerating operation by performing a condensate water restriction control routine of FIG. 6 by using the ECU 33.

In the condensate water restriction control routine of FIG. 6, an engine operating state and an outside air environment are obtained first in 201.

Subsequently, advancement is made to 202, in which whether the EGR cooler 25 falls into a state where cooling performance falls short (that is, whether the inflow coolant temperature of the EGR cooler 25 exceeds the allowable upper limit value) is predicted by determining whether the engine 11 is in the predetermined decelerating operation. Whether the engine 11 is in the predetermined decelerating operation is determined according to, for example, whether an amount of decrease in engine load or engine speed per predetermined time is at or above a predetermined value.

When it is determined in 202 that the engine 11 is not in the predetermined decelerating operation, the EGR cooler 25 is predicted not to fall into a state where cooling performance falls short. Hence, the routine is ended without performing processing in 203.

Meanwhile, when it is determined in 202 that the engine 11 is in the predetermined decelerating operation, the EGR cooler 25 is predicted to fall into a state where cooling performance falls short. Hence, advancement is made to 203, in which the first increase control that increases a flow rate of a coolant flowing into the EGR cooler 25 and the second increase control that increases the air rate of the radiator fan 44 are performed. Processing in 202 functions as a prediction unit and processing in 203 functions as a control unit.

In the second embodiment described above, the EGR cooler 25 is predicted to fall into a state where cooling performance falls short when the engine 11 reaches the predetermined decelerating operation. Hence, whether the EGR cooler 25 falls into a state where cooling performance falls short can be predicted easily.

In the second embodiment, both of the first increase control that increases a flow rate of the coolant flowing into the EGR cooler 25 and the second increase control that increases the air rate of the radiator fan 44 are performed when the engine 11 reaches the predetermined decelerating operation (that is, when the EGR cooler 25 is predicted to fall into a state where cooling performance falls short). However, the present disclosure is not limited to the configuration as above and only either one of the first increase control that increases a flow rate of the coolant flowing into the EGR cooler 25 and the second increase control that increases the air rate of the radiator fan 44 may be performed.

Third Embodiment

A third embodiment of the present disclosure will now be described using FIG. 7. A description will be omitted or given simply for portions substantially same as counterparts of the first embodiment above and the following will chiefly describe a portion different from the first embodiment above.

Figure 7:
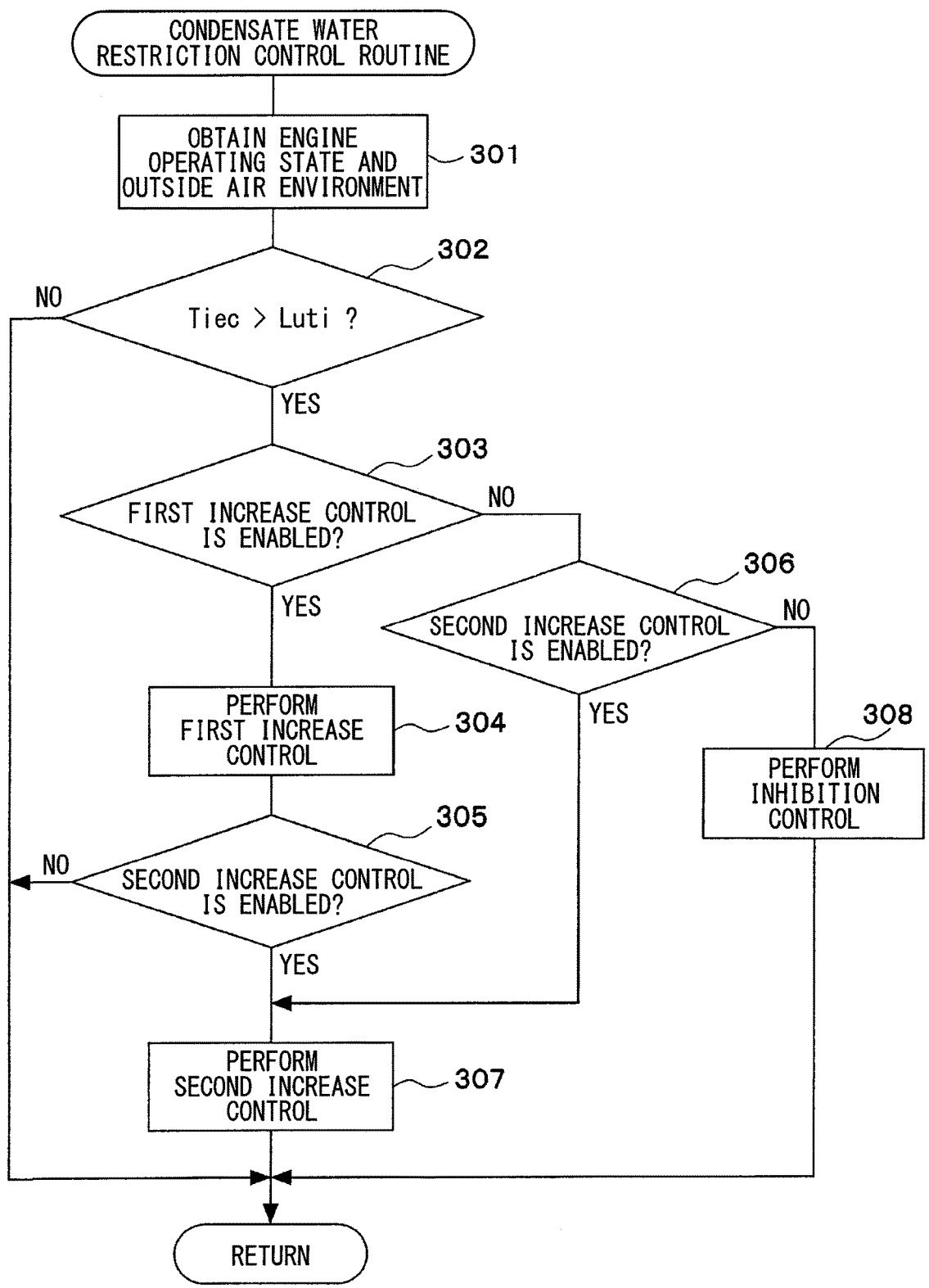
FIG. 7 shows a flowchart depicting a processing flow of a condensate water restriction control routine of a third embodiment.

In the third embodiment, an inhibition control that inhibits an EGR gas from flowing back is performed by performing a condensate water restriction control routine of FIG. 7 by using the ECU 33 when neither the first increase control that increases a flow rate of a coolant flowing into the EGR cooler 25 nor the second increase control that increases the air rate of the radiator fan 44 is enabled.

In the condensate water restriction control routine of FIG. 7, an engine operating state and an outside air environment are obtained first in 301.

Subsequently, advancement is made to 302, in which whether the EGR cooler 25 falls into a state where cooling performance falls short is predicted by predicting whether the inflow coolant temperature of the EGR cooler 25 exceeds the allowable upper limit value.

When it is predicted in 302 that the inflow coolant temperature of the EGR cooler 25 exceeds the allowable upper limit value, the EGR cooler 25 is predicted to fall into a state where cooling performance falls short. Hence, advancement is made to 303, in which whether the first increase control that increases a flow rate of the coolant flowing into the EGR cooler 25 is enabled is determined according to, for example, a state of a water pump 40, a state of a flow rate control valve 41, and a state of a battery (not shown). Processing in 302 functions as a prediction unit.

When it is determined in 303 that the first increase control that increases a flow rate of the coolant flowing into the EGR cooler 25 is enabled, advancement is made to 304, in which the first increase control that increases a flow rate of the coolant flowing into the EGR cooler 25 is performed. Processing in 304 functions as a control unit.

Subsequently, advancement is made to 305, in which whether the second increase control that increases the air rate of the radiator fan 44 is enabled is determined according to, for example, a state of the radiator fan 44 and a state of the battery (not shown).

When it is determined in 305 that the second increase control that increases the air rate of the radiator fan 44 is enabled, advancement is made to 307, in which the second increase control that increases the air rate of the radiator fan 44 is performed. That is, both of the first increase control that increases a flow rate of the coolant flowing into the EGR cooler 25 and the second increase control that increases the air rate of the radiator fan 44 are performed.

By contrast, when it is determined in 305 that the second increase control that increases the air rate of the radiator fan 44 is disabled, the routine is ended without performing the second increase control to increase the air rate of the radiator fan 44. That is, only the first increase control that increases a flow rate of the coolant flowing into the EGR cooler 25 is performed.

Meanwhile, when it is determined in 303 that the first increase control that increases a flow rate of the coolant flowing into the EGR cooler 25 is disabled, advancement is made to 306, in which whether the second increase control that increases the air rate of the radiator fan 44 is enabled is determined.

When it is determined in 306 that the second increase control that increases the air rate of the radiator fan 44 is enabled, advancement is made to 307, in which the second increase control that increases the air rate of the radiator fan 44 is performed. That is, only the second increase control that increases the air rate of the radiator fan 44 is performed. Processing in 307 functions as the control unit.

By contrast, when it is determined in 306 that the second increase control that increases the air rate of the radiator fan 44 is disabled, that is, when neither the first increase control that increases a flow rate of the coolant flowing into the EGR cooler 25 nor the second increase control that increases the air rate of the radiator fan 44 is enabled, advancement is made to 308, in which the inhibition control that inhibits the EGR gas from flowing back is performed. In the inhibition control that inhibits the EGR gas from flowing back, a flow rate of the EGR gas returned to an intake pipe 12 is reduced to zero by keeping an EGR valve 24 closed. Herein, the EGR gas is inhibited from flowing back until a predetermined time (for example, a time required for the inflow coolant temperature of the EGR cooler 25 to fall to or below the allowable upper limit value) elapses. Alternatively, the EGR gas may be inhibited from flowing back until a period during which the inflow coolant temperature of the EGR cooler 25 is at or above a predetermined value (for example, the allowable upper limit value or a temperature at a value slightly less than the allowable upper limit value) is completed. Processing in 308 functions as the control unit.

In the third embodiment described above, the inhibition control that inhibits the EGR gas from flowing back is performed when the EGR cooler 25 is predicted to fall into a state where cooling performance falls short. Owing to the configuration as above, the EGR gas can be prevented from flowing back into the intake pipe 12 by performing the inhibition control to inhibit the EGR gas from flowing back according to a prediction that the EGR cooler falls into a state where cooling performance falls short when the engine 11 is decelerating. Consequently, even when the EGR cooler falls into a state where cooling performance falls short during the transient operation where the engine 11 is accelerated after being decelerated, production of condensate water in an intercooler 21 can be restricted.

Moreover, in the third embodiment, the inhibition control that inhibits the EGR gas from flowing back is performed when neither the first increase control that increases a flow rate of the coolant flowing into the EGR cooler 25 nor the second increase control that increases the air rate of the radiator fan 44 is enabled. Owing to the configuration as above, when the EGR cooler 25 is predicted to fall into a state where cooling performance falls short, the EGR gas is inhibited from flowing back at as low a frequency as possible.

In the third embodiment, the inhibition control that inhibits the EGR gas from flowing back is performed by inhibiting the EGR gas from flowing back until a predetermined time elapses or a predetermined period during which a temperature of the coolant flowing into the EGR cooler is at or above a predetermined value is completed. When configured in the manner as above, an inconvenience that the EGR gas is inhibited from flowing back longer than necessary can be avoided.

In the third embodiment, whether the EGR cooler 25 falls into a state where cooling performance falls short is predicted by predicting whether the inflow coolant temperature of the EGR cooler 25 exceeds the allowable upper limit value. However, the present disclosure is not limited to the configuration as above, and whether the EGR cooler 25 falls into a state where cooling performance falls short may be predicted by determining whether the engine 11 is in the predetermined decelerating operation.

In the third embodiment, the inhabitation control that inhibits the EGR gas from flowing back is performed according to a prediction that the EGR cooler 25 falls into a state where cooling performance falls short only when neither the first increase control that increases a flow rate of the coolant flowing into the EGR cooler 25 nor the second increase control that increases the air rate of the radiator fan 44 is enabled. However, the present disclosure is not limited to the configuration as above, and the inhabitation control that inhibits the EGR gas from flowing back may be performed whenever the EGR cooler 25 is predicted to fall into a state where cooling performance falls short without determining whether the first increase control that increases a flow rate of the coolant flowing into the EGR cooler 25 and the second increase control that increases the air rate of the radiator fan 44 are enabled.

In the respective first through third embodiments above, the flow rate control valve 41 is provided at a branch point of the intercooler channel 37 and the EGR cooler channel 38. However, the present disclosure is not limited to the configuration as above. For example, the flow rate control valve 41 may be provided to the intercooler channel 37 to regulate a flow rate ratio between the coolant flowing into the intercooler 21 and the coolant flowing into the EGR cooler 25 by regulating a flow rate of the coolant flowing into the intercooler 21 by the flow rate control valve 41. Conversely, the flow rate control valve 41 may be provided to the EGR cooler channel 38 to regulate a flow rate ratio between the coolant flowing into the intercooler 21 and the coolant flowing into the EGR cooler 25 by regulating a flow rate of the coolant flowing into the EGR cooler 25 by the flow rate control valve 41.

In the respective first through third embodiments above, functions performed by the ECU 33 (for example, a function as the control unit and a function as the fail-safe control unit), either in part or whole, may be formed of hardware using one or more than one IC or the like.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A low temperature cooling device for an internal combustion engine, comprising:
   an EGR device returning a part of an exhaust gas of an internal combustion engine to an intake passage as an EGR gas;
   a low temperature coolant circuit circulating a coolant through an intercooler cooling an intake gas of the internal combustion engine, an EGR cooler cooling the EGR gas, and a radiator;
   a prediction unit predicting whether the EGR cooler falls into a state where a cooling performance falls short according to at least one of an operating state of the internal combustion engine and an outside air environment while a control that dehumidifies the EGR gas by cooling the EGR gas in the EGR cooler is performed; and
   a control unit performing at least one of a first increase control that increases a flow rate of the coolant flowing into the EGR cooler, a second increase control that increases an air rate of a radiator fan cooling the radiator, and an inhibition control that inhibits the EGR gas from flowing back when the prediction unit predicts that the EGR cooler falls into the state where cooling performance falls short.

2. The low temperature cooling device for the internal combustion engine according to claim 1, wherein:
   the prediction unit predicts that the EGR cooler falls into the state where cooling performance falls short when predicting that a temperature of the coolant flowing into the EGR cooler exceeds an allowable upper limit value.

3. The low temperature cooling device for the internal combustion engine according to claim 1, wherein:

the prediction unit predicts that the EGR cooler falls into the state where cooling performance falls short when the internal combustion engine reaches a predetermined decelerating operation.

4. The low temperature cooling device for the internal combustion engine according to claim 1, wherein:
the prediction unit uses at least one of a speed of the internal combustion engine, a load of the internal combustion engine, a flow rate of the EGR gas, and a temperature of the coolant which has passed through the EGR cooler as the operating state of the internal combustion engine.

5. The low temperature cooling device for the internal combustion engine according to claim 1, wherein:
the prediction unit uses at least one of an outside air temperature and an outside air humidity as the outside air environment.

6. The low temperature cooling device for the internal combustion engine according to claim 1, wherein:
the control unit performs the inhabitation control to inhibit the EGR gas from flowing back when neither the first increase control that increases the flow rate of the coolant flowing into the EGR cooler nor the second increase control that increases the air rate of the radiator fan is enabled.

7. The low temperature cooling device for the internal combustion engine according to claim 1, wherein:
When the control unit performs the inhabitation control to inhibit the EGR gas from flowing back by inhibiting the EGR gas from flowing back, the control unit inhibits the EGR gas from flowing back until a predetermined time elapses or until a period during which a temperature of the coolant flowing into the EGR cooler is at or above a predetermined value is completed.

8. The low temperature cooling device for the internal combustion engine according to claim 1, further comprising:
a separator separating and collecting a condensate water in the EGR gas which has passed through the EGR cooler; and
an EGR heater heating the EGR gas which has passed through the separator.

* * * * *